US006099967A

United States Patent [19]

Takahashi et al.

[11] Patent Number: 6,099,967

[45] Date of Patent: Aug. 8, 2000

[54] HEAT TRANSFER INK RIBBON

[75] Inventors: Hideaki Takahashi; Toshimichi Harada, both of Tochigi, Japan

[73] Assignee: Sony Chemicals Corporation, Tokyo, Japan

[21] Appl. No.: 09/065,105

[22] PCT Filed: Aug. 26, 1997

[86] PCT No.: PCT/JP97/02967

§ 371 Date: Apr. 24, 1998

§ 102(e) Date: Apr. 24, 1998

[87] PCT Pub. No.: WO98/08690

PCT Pub. Date: Mar. 5, 1998

[30] Foreign Application Priority Data

Aug. 27, 1996 [JP] Japan .................................... 8/245512

[51] Int. Cl.[7] ................................ B32B 3/00; B32B 7/00; B32B 27/32

[52] U.S. Cl. .......................... 428/413; 428/207; 428/447; 428/411.1; 428/195; 428/913; 428/914; 428/704; 428/500

[58] Field of Search .................................... 428/195, 207, 428/447, 913, 411.1, 413, 500, 914, 704

[56] References Cited

U.S. PATENT DOCUMENTS

| | | | |
|---|---|---|---|
| 4,797,324 | 1/1989 | Hata | 428/411.1 |
| 5,321,126 | 6/1994 | van Dommelen et al. | 530/382 |
| 5,376,433 | 12/1994 | Fujimaki | 428/195 |
| 5,429,906 | 7/1995 | Bowman et al. | 430/200 |

FOREIGN PATENT DOCUMENTS

| | | |
|---|---|---|
| 0 475 380 A1 | 3/1992 | European Pat. Off. . |
| 0 673 788 B1 | 9/1995 | European Pat. Off. . |
| 60-24996 | 2/1985 | Japan . |
| 63-42891 | 2/1988 | Japan . |
| 5-16533 | 1/1993 | Japan . |
| 6-15965 | 1/1994 | Japan . |
| 7-251572 | 10/1995 | Japan . |
| 7-329427 | 12/1995 | Japan . |
| 8-337066 | 12/1996 | Japan . |

*Primary Examiner*—William Krynski
*Assistant Examiner*—Dawn L. Garrett
*Attorney, Agent, or Firm*—Hill & Simpson

[57] ABSTRACT

This invention is a heat transfer ink ribbon that can exhibit a good heat transfer performance also on labels with a low chemical polarity, e.g., polyolefin type ones, and on matte labels with a rough surface, and yet can form high-quality images with a good stain resistance and solvent resistance even when the edge-face head type printer is used. This ink ribbon comprises a base material and formed on one side thereof an ink layer comprising a colorant and a binder containing a vinyl chloride resin and, and the vinyl chloride resin has at least one of an epoxy group and a strong-acid salt group in its backbone chain or side chain. An intermediate layer capable of undergoing cohesive failure at the time of heat transfer is preferably formed between the base material and the ink layer.

5 Claims, 1 Drawing Sheet

HEAT TRANSFER INK RIBBON

TECHNICAL FIELD

This invention relates to a heat transfer ink ribbon preferably applicable to plastic films used as transfer mediums. More particularly, it relates to a heat transfer ink ribbon that can exhibit a good transfer performance also on plastic films with a low chemical polarity, e.g., polyolefin film, and matte films with a great surface roughness, and yet can form images with a good solvent resistance.

BACKGROUND ART

Heat transfer ink ribbons are conventionally put into wide use in order to print characters or bar-code images on transfer mediums such as cut papers, labels and cards. They have commonly a structure comprising, as shown in FIG. 1A, a base material 1 made of polyester or the like and formed on one side thereof a hot-melt ink layer 2 comprised of a colorant and a binder such as wax.

Now, when stain resistance and solvent resistance are required on transferred images such as characters and bar-code images, thermoplastic resins such as polyester resins (Japanese Patent Application Laid-open No. 5-16535, etc.) or vinyl chloride resins (Japanese Patent Application Laid-open No. 7-76178, Japanese Patent Publication No. 3-18837, etc.) are used as the binder of the hot-melt ink layer 2 of the heat transfer ink ribbon in place of, or together with, the wax. Heat transfer ink ribbons having such an ink layer are called resin type ribbons.

Such resin type ribbons are characteristic of an ink layer 2 having a high toughness. Hence, transferred images formed from this ink layer 2 can be expected to have a high stain resistance and solvent resistance.

However, the transfer performance to transfer mediums tends to lower depending on the proportion of thermoplastic resin in the ink layer 2. This tendency is remarkable especially when not paper but plastic labels or cards having good durability and solvent resistance are used as transfer mediums.

Accordingly, when resin type ribbons are produced, it is common to form the ink layer 2 in a thickness as small as 1.0 μm or below and also to form between the base material 1 and the ink layer 2 an intermediate layer 3 (FIG. 1B) capable of undergoing cohesive failure at the time of heat transfer or a release layer (not shown) capable of being peeled, to thereby improve transfer sensitivity.

However, conventional resin type ribbons have problems on heat transfer performance, solvent resistance or printer adaptability. More specifically, as stated above the ink layer 2 of resin type ribbons is formed in so small a thickness that the ink layer 2 must be incorporated with the colorant in a large quantity so as not to cause a low image density. Hence, there is a problem that the resin type ribbons have a low heat transfer performance or solvent resistance. Thus, it is very difficult to use the resin type ribbons in the field where images are required to be accurate as in bar-code images.

In instances where plastic labels or cards are used as transfer mediums, resins having a good adhesion to them, which usually are thermoplastic resins of the same type as the thermoplastic resins used in the labels or the like, must be selected as binders of the ink layer 2. Since, however, labels have numberless kinds, it is troublesome to change resin type ribbons when labels are changed.

With regard to labels comprised of polyolefin resins such as polyethylene or polypropylene, having a low chemical polarity, or matte film labels with a great surface roughness, it is difficult to improve the heat transfer performance of the ink layer 2 without regard to what types of binders are used in the ink layer 2.

Meanwhile, recently, as shown in FIG. 2, what is called an edge-face head type printer, a heat transfer printer whose heating element 21 is formed at a side edge of a thermal head substrate 22 in the direction of the movement of an ink ribbon 23, attracts notice as a printer that can improve the heat transfer performance of heat transfer ink ribbons. This printer attempts to improve the transfer performance of the ink layer by providing a greater angle θ at which the ink ribbon 23 is peeled from the transfer medium 24, than that of conventional printers, in a hot-molten state or heat-softened state where the ink layer stands in a low cohesive force.

When, however, conventional resin type ribbons are applied in this edge-face head type printer, there has been the problem that the ink layer 2 is not sharply separated and transferred from the base material 1, but the ink layer 2 causes cohesive failure in it, resulting in a low transfer density of the images obtained.

The present invention solves the above problems the prior art has had. Accordingly, an object of the present invention is to provide a heat transfer ink ribbon that can exhibit a good heat transfer performance also on labels with a low chemical polarity, e.g., polyolefin type ones, and on matte labels with a rough surface, and yet can form high-quality images with a good stain resistance and solvent resistance even when the edge-face head type printer is used.

DISCLOSURE OF THE INVENTION

The present inventors have discovered that the above object can be achieved when, as a binder in an ink layer of a heat transfer ink ribbon, a vinyl chloride resin is used which has at least one of an epoxy group and a strong-acid salt group in the backbone chain or side chain, thus they have accomplished the present invention.

More specifically, the present invention provides a heat transfer ink ribbon comprising a base material and formed on one side thereof an ink layer comprising a colorant and a binder containing a vinyl chloride resin, wherein the vinyl chloride resin has at least one of an epoxy group and a strong-acid salt group in its backbone chain or side chain.

BEST MODE FOR WORKING THE INVENTION

Figure 1A:
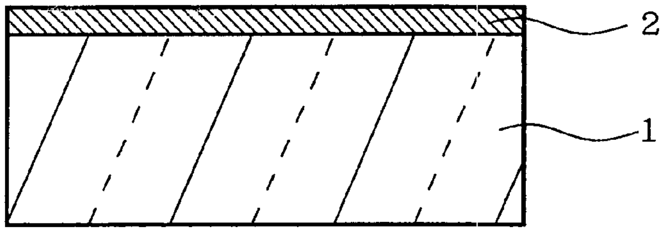
FIGS. 1A and 1B are cross-sectional views of heat transfer ink ribbons.

The heat transfer ink ribbon of the present invention has basically the same structure as conventional heat transfer ink ribbons. More specifically, the heat transfer ink ribbon of the present invention has a structure having, as shown in FIG. 1A, a base material and formed thereon an ink layer 2 comprising a colorant and a binder containing a vinyl chloride resin.

Here, a vinyl chloride resin having at least one of, and preferably both of, an epoxy group and a strong-acid salt group in the backbone chain or side chain is used as the binder of the ink layer 2. Thus, since a vinyl chloride resin having a functional group or groups with a high polarity is contained as the binder, the bond between the transfer medium surface and the ink layer 2 can be so strong that a superior transfer performance can be achieved even when the colorant is incorporated in the ink layer 2 in a large quantity and also without regard to the types and surface properties of plastic labels. Moreover, in the ink layer 2, the functional group on the colorant surface strongly combines with the epoxy group and strong-acid salt group of the binder, and hence the ink layer 2 can be improved in stain resistance and solvent resistance even when the colorant is incorporated in the ink layer 2 in a large quantity.

The vinyl chloride resin used in the present invention may be a homopolymer of vinyl chloride, or may be a copolymer resin of vinyl chloride with a different monomer. In the latter case, it is preferable for the different monomer to have at least one of the epoxy group and the strong-acid salt group.

To introduce the epoxy group in the backbone chain or side chain of the vinyl chloride resin, it may be introduced by, e.g., (a) a method of copolymerizing vinyl chloride with a monomer containing an epoxy group copolymerizable with the vinyl chloride, (b) a method of copolymerizing vinyl chloride with a monomer having a hydroxyl group copolymerizable with the vinyl chloride, followed by dehydrochlorination reaction using alkali hydroxide, or (c) a method in which vinyl chloride having a double bond is allowed to react with an organic peracid.

The epoxy group-containing monomer may include glycidyl ethers of unsaturated alcohols, such as allyl glycidyl ether and methallyl glycidyl ether; glycidyl esters of unsaturated acids, such as glycidyl acrylate, glycidyl methacrylate, glycidyl-p-vinyl benzoate, methyl glycidyl itaconate, glycidyl ethyl maleate, glycidyl vinyl sulfonate, and glycidyl acryl- or methacryl-sulfonate; and epoxyolefins such as butadiene monoxide, vinyl cyclohexene monoxide and 2-methyl-5,6-epoxyhexene.

The strong-acid salt group may include, e.g., $SO_3M$, $SO_4M$ and $PO_4M_2$ (wherein M is an alkali metal or $NH_4$).

To introduce the strong-acid salt group into the vinyl chloride resin, it may be introduced by copolymerizing vinyl chloride with a monomer containing a strong-acid salt group copolymerizable with the vinyl chloride.

Among strong-acid salt group-containing monomers, as examples of the one having $SO_3M$, it may include alkali metal salts or ammonium salts of acids such as vinylsulfonic acid, methylvinylsulfonic acid, allyl- or methallylsuflonic acid, styrene sulfonic acid, 2-sulfoethyl acrylate or methacrylate, 2-acrylamide-2-methylpropanesulfonic acid and 3-allyloxy-2-hydroxypropanesulfonic acid. As examples of the one having $SO_4M$, it may include alkali metal salts or ammonium salts of acids such as 2-(hydroxysulfonyloxy)ethyl acrylate or methacrylate and 3-allyloxy-2-hydroxypropanesulfuric acid. As examples of the one having $PO_4M_2$, it may include alkali metal salts or ammonium salts of acids such as 3-chloro-2-phosphopropyl acrylate or methacrylate, 3-chloro-2-phosphoethyl acrylate or methacrylate and 3-allyloxy-2-hydroxypropanephosphoric acid.

As the vinyl chloride resin used in the present invention, commercially available products may be used. For example, vinyl chloride copolymers may be used which are specified as trade names MR110, MR112, MR113, MR104, etc, available from Nippon Zeon Co., Ltd.

The ink layer 2 may be constituted only of the vinyl chloride resin described above, but the effect of the present invention can be brought about so long as it is mixed in an amount of at least 20% by weight of the binder. Here, as a resin usable in combination with the vinyl chloride resin used in the present invention, it may include polyester, polyurethane, nitrocellulose, ketone resins, styrene resins, and chlorinated polyolefins (e.g., chlorinated polyethylene and chlorinated polypropylene). Of these, a chlorinated polyolefin, in particular, a chlorinated polyolefin having a number average molecular weight of from about 5,000 to about 10,000, may preferably be used in order to improve the transfer performance of the ink layer 2 while maintaining the effect of the present invention. The chlorinated polyolefin having such a number average molecular weight may be incorporated in an amount of at least 50% by weight in the binder, whereby the transfer performance of the ink layer 2 can be greatly improved.

In the ink layer 2, the weight ratio of the colorant to the binder (colorant/binder) may preferably be from 0.5 to 4.0, and more preferably from 1.0 to 2.0, because image density can not be sufficient if the ratio is too small and the ink layer 2 or picture elements may have insufficient solvent resistance if it is too large. When it is within the range of from 1.0 to 2.0, the image density and the solvent resistance can be very well balanced.

As the colorant incorporated in the ink layer 2, any of those used in conventional heat transfer ink ribbons may be used. For example, carbon black, and color pigments, e.g., Carmine 6B (magenta), Yellow GL (yellow), Blue 4040 (cyan) and Orange G (orange) may be used.

The ink layer 2 may have a thickness of from 0.3 to 2.5 μm in usual instances, and from 1.0 μm or smaller in view of practical use, which may be appropriately selected taking account of the relationship between it and other constituents, e.g., the base material 1 or an intermediate layer 3 described later, and the image density.

As the base material 1 used in the present invention, any of those used in conventional heat transfer ink ribbons may be used. For example, paper base materials such as condenser paper and parchment paper, and plastic base materials such as polyester film, polyvinyl chloride film and polycarbonate film may be used.

The base material 1 may have a thickness of from 2 to 12 μm in usual instances, and from 3.5 to 6 μm in view of practical use.

Figure 1B:
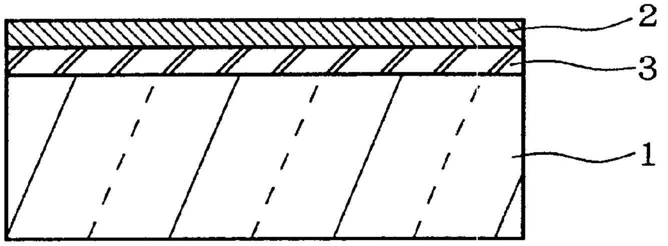
Figure 2:
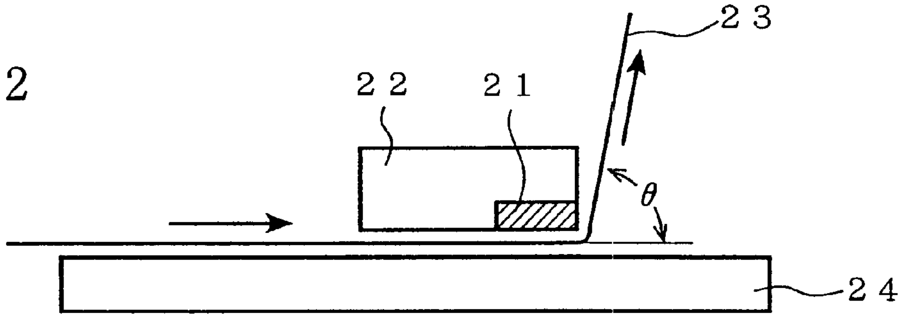
FIG. 2 is a schematic illustration of a heating head and its vicinity, of an edge-face head type printer.

The heat transfer ink ribbon having an embodiment where the ink layer 2 is formed on the base material 1 has been described above with reference to FIG. 1A. When the adaptability of the heat transfer ink ribbon to the edge-face head type printer should be more improved, in order to prevent cohesive failure of the ink layer 2 itself to materialize better transfer, an intermediate layer 3 may preferably be formed between the base material 1 and the ink layer 2 as a layer capable of undergoing cohesive failure at the time of heat transfer (FIG. 1B). Providing such an intermediate layer 3 not only brings about an improvement in transfer performance, but also prevents the ink layer 2 from cutting or coming off because the intermediate layer 3 stands well adhered to the both layers at usual times.

As materials for the intermediate layer 3, hot-melt substances having a lower melting point or softening point than the melting point or softening point of the ink layer 2 may preferably be used. Stated specifically, any of waxes such as carnauba wax, candelilla wax, rice wax, paraffin wax and polyethylene wax or thermoplastic resins such as EVA, polyester resins, styrene resins and polyamide resins may be used alone or in the form of a mixture.

The thickness of the intermediate layer 3 may be appropriately selected taking account of other constituent factors, e.g., the constituent materials for the base material 1 and ink layer 2 and printing conditions, and the cohesive failure commonly more tends to occur when the intermediate layer 3 has a larger thickness than the thickness of the ink layer 2. In the case when the ink ribbon is used in usual heat transfer printers, the intermediate layer 3 can be well effective in a thickness of from 0.2 to 0.7 $\mu$m. In the case when used in the edge-face head type printer, the intermediate layer 3 may preferably be formed in a large thickness of from 0.5 to 1.5 $\mu$m.

In the heat transfer ink ribbon of the present invention, a heat-resistant lubricating layer comprised of a known silicon copolymer or silicone oil may be formed on the base material 1 on its side where the ink layer 2 is not formed. This brings about an improvement in travel performance of the heat transfer ink ribbon. Here, the heat-resistant lubricating layer may be usually in a thickness of from 0.1 to 0.5 $\mu$m.

The heat transfer ink ribbon of the present invention can be produced by conventional methods. For example, an intermediate layer forming composition may be coated by gravure coating or the like on a filmy base material to form the intermediate layer and an ink layer forming composition may be further coated thereon by gravure coating or the like to form the ink layer.

The heat transfer ink ribbon of the present invention as described above has a good heat transfer performance also on labels with a low chemical polarity, e.g., polyolefin type ones, and on matte labels with a rough surface, and yet can form high-quality images with a good stain resistance and solvent resistance even when the edge-face head type printer is used.

EXAMPLES

The present invention will be described below in greater detail by giving Examples.

Example 1

(Production of heat transfer ink ribbon)

(1) Formation of heat-resistant lubricating layer:

Polyester film of 5.0 $\mu$m thick (available from Teijin Limited) was prepared as a base material film, and a heat-resistant lubricating layer forming composition as shown in Table 1 was coated on its one side by means of a gravure coater, followed by removal of the solvent in a drying furnace to form a heat-resistant lubricating layer. The layer had a coating weight of 0.1 g/m2 after drying.

TABLE 1

| Components | parts by weight |
|---|---|
| Acryl-silicone graft polymer | 1.2 |
| Isocyanate | 0.8 |
| Methyl ethyl ketone | 78 |
| Toluene | 20 |

(2) Formation of intermediate layer:

On the base material film surface on the side opposite to the heat-resistant lubricating layer, an intermediate layer forming composition as shown in Table 2 was coated by means of a gravure coater, followed by removal of the solvent in a drying furnace to form an intermediate layer. The layer had a coating thickness of 0.7 $\mu$m after drying.

TABLE 2

| Components | parts by weight |
|---|---|
| Carnauba wax | 10 |
| Ethylene-vinyl acetate copolymer | 10 |
| Toluene | 80 |

(3) Formation of ink layer:

On the intermediate layer, an ink layer forming composition as shown in Table 3 was coated by means of a gravure coater, followed by removal of the solvent in a drying furnace to form an ink layer. The ink layer had a layer thickness of 0.3 $\mu$m after drying. Thus, a heat transfer ink ribbon constituted of four-layers was obtained.

The whole heat transfer ink ribbon had a coating thickness of 1.1 $\mu$m

TABLE 3

| Components | parts by weight |
|---|---|
| Vinyl chloride resin*1 | 5 |
| Carbon black | 5 |
| Methyl ethyl ketone | 90 |

*1: Resin produced according to Reference Example 1 in Japanese Patent Application Laid-open No. 1-232523 (corresponding to MR110, available from Nippon Zeon Co., Ltd.)

Examples 2 to 6, Comparative Example 1 and 2

(Production of heat transfer ink ribbons)

Heat transfer ink ribbons of Examples 2 to 5 were produced in the same manner as in Example 1 except that the ratio of the vinyl chloride resin to the colorant in the ink layer was changed as shown in Table 4. A heat transfer ink ribbon of Example 6 was also produced in the same manner as in Example 1 except that the intermediate layer capable of undergoing cohesive failure at the time of heat transfer was formed in the thickness shown in Table 4.

Heat transfer ink ribbons of Comparative Examples 1 and 2 were also produced in the same manner as in Example 1 except that resins having neither the epoxy group nor the strong-acid salt group was used as the binder of the ink layer.

Evaluation

Using the heat transfer ink ribbons of Examples 1 to 6 and Comparative Examples 1 and 2, evaluation samples were produced under the following printing conditions. The evaluation samples produced were evaluated on the following evaluation items. The results are shown in Table 4.

Printing conditions:

Printer: B-572-QP (edge-face head type), manufactured by TEC Co.

Printing speed: 3 inch/sec

Image patterns: Bar-code pattern images and solid pattern images (for image density)

Transfer mediums:

a) FLEXCON PE380FW (polyethylene matte label, available from Flexcon Co.)

b) FASSON TRANSCODE S475 (polyolefin label, available from Fasson Co.)

c) 7816 (polyester label, available from 3M Co.)

Evaluation Items

Transfer performance:

Given bar-code images were printed on transfer mediums, and the accuracy of images was measured using a checker (Laser Check, available from Symbol Co.). An instance where the given patterns were readable was evaluated as "A"; and an instance where they were not, as "B".

Solvent resistance (durability):

The bar-code images were rubbed five times with cotton cloths impregnated with various solvents, and the degree of disorder of images was visually examined. An instance where the images had no scratches was evaluated as "A"; an instance where the images had slight scratches, as "B"; and an instance where the images were taken off, as "C". In practical use, those evaluated as "B" or "A" are suitable.

Image density:

Image density was measured using Macbeth TR924. Measurement errors of image density are about plus-minus 0.1.

Occurrence of cohesive failure:

Whether or not the ink layer caused cohesive failure at the time of heat transfer was visually examined.

preferable for the intermediate layer to have a thickness of 0.3 μm or larger.

In Examples 3 and 4, in which the ratio of P (resin)/B (carbon black) was 3 or more, the solvent resistance tended to lower. In Example 5, in which the P/B ratio was less than 1, the image density tended to decrease. Thus, as can be seen therefrom, it is preferable for the P/B ratio to be from 1 to 3.

On the other hand, in the case of the heat transfer ink ribbon of Comparative Example 1, the vinyl chloride-vinyl acetate copolymer used as the binder of the ink layer contains neither the epoxy group nor the strong-acid salt group, as being different from the vinyl chloride resin, the binder used in Examples 1 to 6. Hence, under conditions of the ink layer thickness (0.3 μm) and the carbon black content (50% by weight) higher than ever, as shown in Table 4, it was impossible to transfer images to both the polyolefin label and the matte label, except the polyester label.

TABLE 4

| | Example | | | | | | Comparative Example | |
|---|---|---|---|---|---|---|---|---|
| | 1 | 2 | 3 | 4 | 5 | 6 | 1 | 2 |
| Ink layer (0.3 μm thick) | | | | | | | | |
| Vinyl chloride resin*1: | 50 | 33 | 25 | 20 | 60 | 50 | — | — |
| VC-VAc copolymer*2: | — | — | — | — | — | — | 50 | — |
| Polyester resin*3: | — | — | — | — | — | — | — | 50 |
| Carbon black: | 50 | 66 | 75 | 80 | 40 | 50 | 50 | 50 |
| Intermediate layer, thickness: (μm) | 0.7 | 0.7 | 0.7 | 0.7 | 0.7 | 0.3 | 0.7 | 0.7 |
| Evaluation results | | | | | | | | |
| Transfer performance: | | | | | | | | |
| a) Matte label: | A | A | A | A | A | A | C | A |
| b) Polyolefin label: | A | A | A | A | A | A | C | C |
| c) Polyester label: | A | A | A | A | A | A | A | A |
| Solvent resistance: | | | | | | | | |
| a) Matte label: | A | A | B | B | A | A | — | C |
| b) Polyolefin label: | A | A | B | B | A | A | — | — |
| c) Polyester label: | A | A | A | A | A | A | A | A |
| Image density [a) matte label]: | 1.60 | 1.75 | 1.90 | 1.90 | 1.45 | 1.55 | — | 1.60 |
| Ink layer cohesive failure: | No | No | No | No | No | Yes* | No | No |

*slightly occurred
*1: MR110, available from Nippon Zeon Co., Ltd.
*2: Vinyl chloride-vinyl acetate copolymer (SOLBINE, available from Sekisui Chemical Co., Ltd.)
*3: Polyester resin (UE3500, available from Yunichika, Ltd.)

Results

As can be seen from Table 4, the heat transfer ink ribbon of Example 1 according to the present invention exhibited a good transfer performance without regard to whether the material of the transfer medium had a high or low chemical polarity, and also attained a good solvent resistance and a good image density on various labels. The intermediate layer also underwent cohesive failure to prevent the ink layer from undergoing cohesive failure.

The heat transfer ink ribbons of Examples 2 to 6 also exhibited good results on transfer performance, image density and solvent resistance. The heat transfer ink ribbons of Examples 2 to 5 did not cause the cohesive failure of the ink layer at the time of heat transfer. In respect of Example 6, the ink layer was seen to have slightly caused cohesive failure because of the intermediate layer with a small thickness, which cohesive failure, however, was at a level not problematic in practical use. Thus, as can be seen therefrom, it is Incidentally, the bar-code images printed on the polyester label had an insufficient solvent resistance.

In the case of the heat transfer ink ribbon of Comparative Example 2, since the polyester label conventionally used was used as the binder of the ink layer, there were no problems on transfer performance and image density in respect of the matte label and polyester label, but it was impossible to transfer images to the polyolefin label. Moreover, since the carbon black was mixed in the ink layer in an amount of 50% by weight in order to improve image density, the bar-code images printed on the matte label had an insufficient solvent resistance.

Example 7

A heat transfer ink ribbon was produced in the same manner as in Example 1 except that the ink layer forming composition of the heat transfer ink ribbon was replaced with the one formulated as shown in Table 5.

TABLE 5

| Components | parts by weight |
|---|---|
| Vinyl chloride resin*1 | 2 |
| Chlorinated polypropylene*4 | 3 |
| Carbon black | 5 |
| Methyl ethyl ketone | 80 |
| Toluene | 10 |

*1: The same as that in TABLE 3.
*4: SUPERCHLON 602, available from Nippon Seishi K.K.)

Evaluation

Using the heat transfer ink ribbon of Example 7, an evaluation sample was produced under the following printing conditions. The evaluation sample produced was evaluated on its transfer performance in the same manner as in Example 1. As the result, the evaluation samples of Examples 1 and 7 both exhibited a good transfer performance when the printing voltage was higher by about 0.4 V than standard voltage, but the evaluation sample of Example 7 exhibited a better transfer performance than the evaluation sample of Example 1 when the printing voltage was standard voltage. It was seen from this fact that it was more preferable to use chlorinated polypropylene as the binder of the ink layer.

Printing conditions:

Printer: The same as in Example 1

Printing speed: The same as in Example 1

Printing voltage: Standard voltage, and voltage higher by about 0.4 V than the standard voltage Image patterns: The same as in Example 1

Transfer mediums: FLEXCON PE380FW (polyethylene matte label, available from Flexcon Co.)

POSSIBILITY OF INDUSTRIAL UTILIZATION

As described above, the heat transfer ink ribbon of the present invention can achieve a good transfer performance and can improve solvent resistance of transferred images, and hence it is an ink ribbon suited for polyolefin labels with a low chemical polarity and matte labels with rough surface properties. In particular, it is suited for the printing of bar-code images required to be accurate images.

Moreover, the heat transfer ink ribbon of the present invention contributes to a good solvent resistance of images formed on labels with a high chemical polarity as in polyester labels, and hence it can be substantially disregarded to change ink ribbons with change of labels on all such occasions. Thus, the heat transfer ink ribbon of the present invention enables printing operation at a high efficiency.

The heat transfer ink ribbon of the present invention also does not cause any lowering of heat transfer performance and solvent resistance even when the ink layer contains the colorant in a large quantity, and hence it becomes possible to form the ink layer in a smaller thickness, so that the production cost and running cost can be made lower.

When in the heat transfer ink ribbon of the present invention the intermediate layer capable of undergoing cohesive failure at the time of heat transfer is formed between the base material and the ink layer, the ink ribbon can be preferably applied in what is called the edge-face head type printers.

What is claimed is:

1. A heat transfer ink ribbon comprising a base material and an ink layer formed on one side of said base material, said ink layer comprising, a colorant and a binder containing a vinyl chloride resin and a chlorinated polyolefin, wherein the vinyl chloride resin has at least one of an epoxy group and a strong-acid salt group in its backbone chain or side chain.

2. The heat transfer ink ribbon according to claim 1, wherein said chlorinated polyolefin is chlorinated polyethylene or chlorinated polypropylene.

3. The heat transfer ink ribbon according to claim 1, wherein said chlorinated polyolefin has a number average molecular weight of from about 5,000 to about 10,000.

4. The heat transfer ink ribbon according to claim 1, wherein said chlorinated polyolefin is contained in the binder in an amount of at least 50% by weight.

5. A heat transfer ink ribbon comprising abase material and an ink layer formed on one side of said base material, said ink layer comprising a colorant and a binder containing a vinyl chloride resin, the vinyl chloride resin is a copolymer resin of vinyl chloride with a different monomer, the different monomer contains a strong-acid salt group, and wherein the strong-acid salt group is $PO_4M_2$ and is an alkali metal salt or an ammonium salt of 3-chloro-2-phosphopropyl acrylate or methacrylate, 3-chloro-2-phosphoethyl acrylate or methacrylate, or 3-allyloxy-2-hydroxypropanephosphoric acid.

* * * * *